United States Patent
Holloway et al.

(10) Patent No.: US 10,791,110 B2
(45) Date of Patent: Sep. 29, 2020

(54) CERTIFICATE AUTHORITY FRAMEWORK

(71) Applicant: CLOUDFLARE, INC., San Francisco, CA (US)

(72) Inventors: Lee Hahn Holloway, Santa Cruz, CA (US); Nicholas Thomas Sullivan, San Francisco, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 157 days.

(21) Appl. No.: 15/206,118

(22) Filed: Jul. 8, 2016

(65) Prior Publication Data
US 2017/0012967 A1 Jan. 12, 2017

Related U.S. Application Data

(60) Provisional application No. 62/190,692, filed on Jul. 9, 2015.

(51) Int. Cl.
*H04L 29/06* (2006.01)
*H04L 9/32* (2006.01)

(52) U.S. Cl.
CPC ........ *H04L 63/0823* (2013.01); *H04L 9/3247* (2013.01); *H04L 9/3263* (2013.01); *H04L 9/3297* (2013.01)

(58) Field of Classification Search
CPC .. H04L 63/0823; H04L 9/3247; H04L 9/3263
See application file for complete search history.

(56) References Cited

U.S. PATENT DOCUMENTS

| | | | |
|---|---|---|---|
| 8,327,128 B1 * | 12/2012 | Prince | H04L 63/0823 713/150 |
| 8,782,774 B1 | 7/2014 | Pahl et al. | |
| 8,966,267 B1 | 2/2015 | Pahl et al. | |
| 8,996,873 B1 | 3/2015 | Pahl et al. | |
| 9,184,911 B2 | 11/2015 | Pahl et al. | |
| 9,614,833 B1 * | 4/2017 | Rao | H04L 63/0823 |
| 2003/0126431 A1 * | 7/2003 | Beattie | G06F 21/6218 713/156 |
| 2003/0182573 A1 * | 9/2003 | Toneguzzo | G06F 16/9535 713/176 |
| 2004/0133774 A1 * | 7/2004 | Callas | H04L 63/0428 713/153 |
| 2004/0148505 A1 * | 7/2004 | Qiu | G06F 21/33 713/175 |

(Continued)

*Primary Examiner* — Chau Le
*Assistant Examiner* — Vance M Little
(74) *Attorney, Agent, or Firm* — Nicholson De Vos Webster & Elliott LLP

(57) ABSTRACT

A server receives a single certificate signature request from a requestor and determines that the requestor is authorized for a certificate corresponding to the single certificate signature request. The server generates a first certificate corresponding to the single certificate signature request, wherein the first certificate has a first expiry value. The server transmits the generated first certificate to the requestor. Responsive to an amount of time elapsing, the server automatically generating a second certificate corresponding to the single certificate signature request, wherein the amount of time expiring is less than the first expiry value. The server transmits the generated second certificate to the requestor.

27 Claims, 6 Drawing Sheets

(56) References Cited

U.S. PATENT DOCUMENTS

| | | | | |
|---|---|---|---|---|
| 2005/0076201 A1* | 4/2005 | Thornton | ............ | H04L 63/0823 |
| | | | | 713/156 |
| 2006/0047951 A1* | 3/2006 | Reilly | ................ | H04L 9/3263 |
| | | | | 713/158 |
| 2006/0047965 A1* | 3/2006 | Thayer | ............... | H04L 63/0823 |
| | | | | 713/176 |
| 2006/0155855 A1* | 7/2006 | Hamai | ............... | H04L 63/0823 |
| | | | | 709/227 |
| 2006/0168443 A1* | 7/2006 | Miller | ............... | H04L 63/0823 |
| | | | | 713/156 |
| 2010/0111300 A1* | 5/2010 | Kido | ................. | H04L 63/0823 |
| | | | | 380/46 |
| 2010/0138907 A1* | 6/2010 | Grajek | .............. | H04L 63/0823 |
| | | | | 726/10 |
| 2011/0126001 A1* | 5/2011 | Fu | ......................... | H04L 63/06 |
| | | | | 713/156 |
| 2013/0238895 A1* | 9/2013 | Dixon | ................ | H04L 9/0825 |
| | | | | 713/156 |
| 2013/0333030 A1* | 12/2013 | Farris | ................ | H04L 63/123 |
| | | | | 726/22 |
| 2015/0271177 A1* | 9/2015 | Mun | ................. | H04L 63/0876 |
| | | | | 726/7 |

* cited by examiner

CERTIFICATE AUTHORITY FRAMEWORK

CROSS-REFERENCE TO RELATED APPLICATIONS

This application claims the benefit of U.S. Provisional Application No. 62/190,692, filed Jul. 9, 2015, which is hereby incorporated by reference.

FIELD

Embodiments of the invention relate to the field of secure network communications; and more specifically, to a certificate authority framework.

BACKGROUND

Secure Sockets Layer (SSL) and Transport Layer Security (TLS), which is the successor to SSL, provide secure network connections. SSL and/or TLS are commonly used during web browsing (e.g., using HTTPS), email, and other Internet applications. SSL and TLS are described in several Request For Comments (RFCs), including RFC 2246 (describing TLS 1.0), RFC 4346 (describing TLS 1.1), RFC 5246 (describing TLS 1.2), and RFC 6101 (describing SSL 3.0).

SSL certificates form the core of trust on the Internet by assuring the identity of websites. This trust is built by digitally binding a cryptographic key to an organization's identity. An SSL certificate will bind domain names to server names, and company names to locations. This ensures that if you go to your bank's web site, for example, you know for sure it is your bank, and you are not giving out your information to a phishing scam. A certificate is a file that contains a public key which is bound to a record of its owner. The mechanism that makes this binding trustworthy is called the Public Key Infrastructure and public-key cryptography is the glue that makes this possible. A certificate is typically associated with a private key that corresponds to the certificate's public key, which is stored separately. The certificate comes with a digital signature from a trusted third-party called a certificate authority or CA. A certificate therefore typically includes: information about the organization that the certificate is issued to; a public key; information about the organization that issued the certificate; the rights granted by the issuer (e.g., the validity period for the certificate, which hostnames the certificate is valid for, the allowed uses (client authentication, server authentication)); and a digital signature by the issuer certificate's private key. The owner of a certificate can digitally sign data, and a verifier can use the public key from the certificate to verify it. The fact that the certificate is itself digitally signed by a third party CA means that if the verifier trusts the third party, they have assurances that the certificate is legitimate. The CA can give a certificate certain rights, such as a period of time in which the identity of the certificate should be trusted.

The standard CA system includes a centrally located CA that creates signatures in response to certificate signature requests (CSRs). A CSR is a message sent from an applicant to the CA that applies for the certificate. The applicant first generates a key pair, keeping the private key secret, and includes information in the CSR identifying the applicant and the public key and is signed using the applicant's private key. The CA processes these CSRs as they come in and the certificates typically have long expiry periods (usually greater than or equal to one year).

Some certificates are signed by an intermediate CA, which is itself signed by a different CA. In this case, a certificate verifier can follow the chain until they find a certificate that they trust (the root). Thus, certificates can be chained such that one certificate is signed by another certificate. The length of intermediate certificates in a chain can vary, but chains will always have at least one leaf certificate and one root certificate.

This chain of trust model can be very useful for the CA. It allows the root certificate's private key to be kept offline and only used for signing intermediate certificates. Intermediate CA certificates can be shorter lived and be used to sign endpoint certificates on demand Shorter-lived online intermediates are easier to manage and revoke if compromised.

Typically presenting only the leaf certificate to the client (e.g., web browser) is not enough. The intermediate certificate(s) are not always known to the client thereby requiring the website to include them with the leaf certificate, in what is called a certificate bundle. A certificate bundle is a list of certificates that the client needs to validate a certificate. The certificate bundle should include all the certificates in the chain up to the first certificate known to the client. Each browser has unique capabilities and configurations, and a certificate bundle that is trusted in one browser might not be trusted in another browser.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
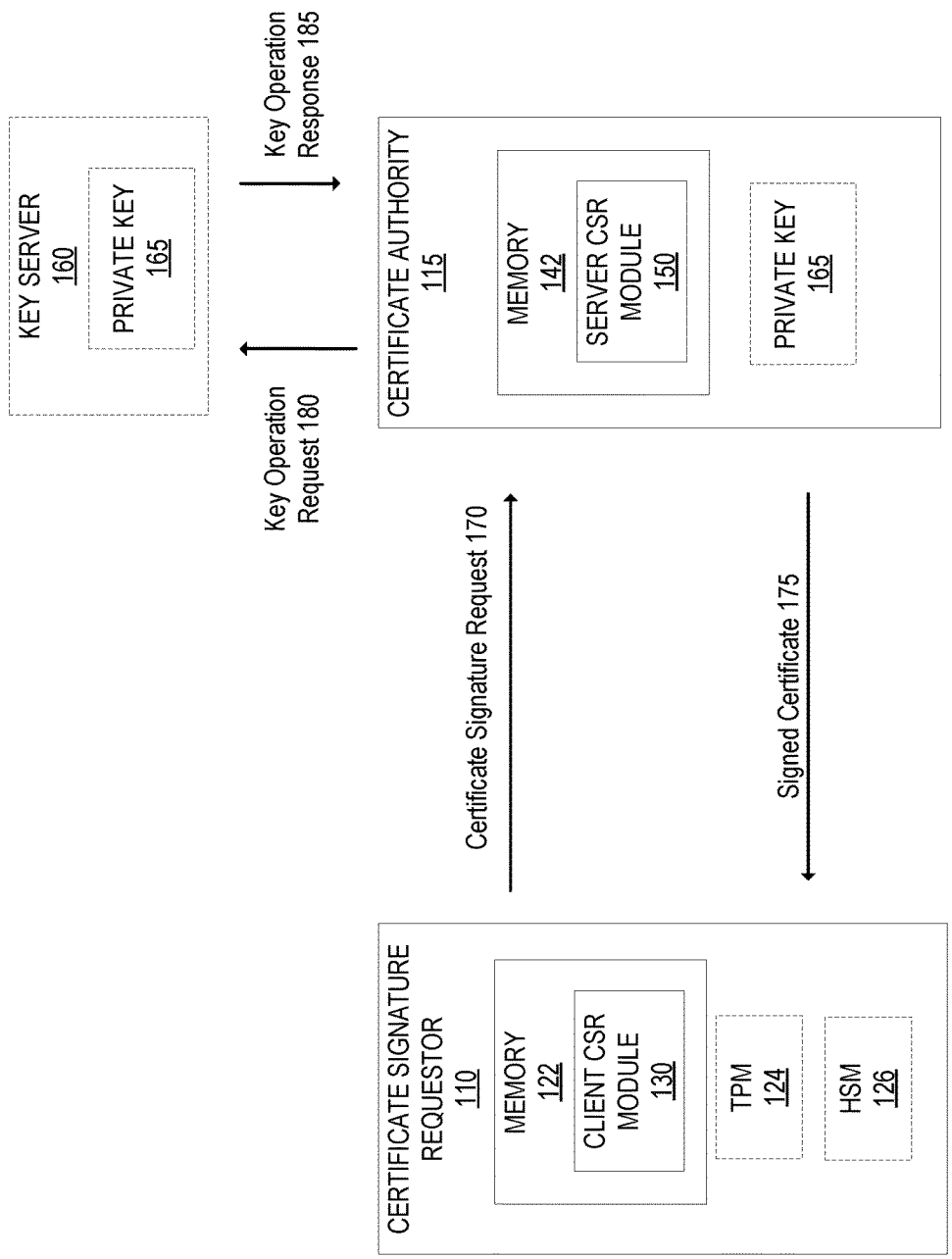
FIG. 1 illustrates an exemplary certificate authority framework according to some embodiments.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for a certificate authority framework for widely deployed network of servers is described. In an embodiment, the SSL keys are managed on a distributed network where the certificate authority is distributed. In such an embodiment, rather than all edge locations requesting certificates from a central location, the functionality of the signing CA is distributively located. For instance, multiple CAs with the same CA signing key can exist in the edge locations. As another example, each edge location can host its own intermediate CA. For additional safety, the private key can be hosted in an HSM, protected by TPM, or handled via a remote proxy that is authenticated and encrypted with appropriate access controls.

In an embodiment, upon receipt of a CSR, the CA periodically produces short-expiry certificates that are created and scheduled based on at least frequency and expiry length. For example, upon receipt of a single CSR, the CA can generate and provide certificates once a week that each expire in 5 weeks. A web server that uses this certificate can keep the same private key and rotate the certificates. This also helps prevent management of large revocation lists because these short-expiry certificates quickly expire so the list also expires. The expiry length can be as short as one hour to something less than a year in some embodiments. The certificates can be distributed in a number of ways. In an embodiment, certificates can be distributed with a global push-based system. In another embodiment, web servers can request new certificates only when needed and be given the latest published certificates (a pull-based on-demand system).

In an embodiment, a CA creates a certificate from an already-known CSR on an on-demand basis. The CA signs a new certificate for a known domain on demand (as requested). In some cases, the CA may pre-compute a new certificate periodically. For instance, for a high-volume website, the CA may pre-compute a new certificate every minute.

In an embodiment, a private key is pre-distributed to multiple server locations and bound to the hardware using a TPM or HSM.

In an embodiment, a private key is stored remotely and the key signing operation is performed with a remote procedure call.

In an embodiment, a certificate chain is produced that is accepted by a majority of operating systems and browsers with optimal performance Knowledge of trusted root certificates is assembled from different operating systems and browsers. The selection can be tuned to weight criteria differently including the strength of the cryptographic algorithm, the strength of the hash function, the certificate chain length, and acceptance coverage in desktop and mobile browsers.

FIG. 1 illustrates an exemplary certificate authority framework according to some embodiments. The certificate signature requester 110 is a computing device that is capable of requesting a digital certificate from the certificate authority 115. For example, the certificate signature requestor 110 may generate and transmit a CSR 170 to the certificate authority 115 and receive and install a certificate 175 from the certificate authority 115. The certificate signature requestor 110 may be implementing a web server or other application that uses a secure connection and requires the use of a digital certificate. The certificate signature requester 110 includes a memory 122, which may be a non-transitory machine-readable storage medium, that stores the client CSR module 130. The client CSR module 130 is code that when executed by a processor of the certificate signature requestor 110 performs some operations described herein. The certificate signature requestor 110 may also include a trusted platform module (TPM) 124 and/or a hardware security module (HSM) 126. The private key of the requestor may be stored inside of the TPM 124 or the HSM 126.

The certificate authority 115 is a computing device that is capable of responding to CSRs and generating certificates. The certificate authority 115 may be an intermediate certificate authority in some embodiments. The certificate authority 115 includes a memory 142, which may be a non-transitory machine-readable storage medium, that stores the server CSR module 150. The server CSR module 150 is code that when executed by a processor of the certificate authority 115 performs operations described herein. The certificate authority 115 may also include a TPM or HSM that stores the private key 165, which is used to sign the certificates.

In some embodiments, the certificate authority 115 does not include the private key 165, but instead that private key 165 is stored remotely on the key server 160. When a private key operation is needed such as the signing of a certificate, the certificate authority 115 transmits a key operation request 180 to the key server 160. The key operation request 180 includes information necessary for the key server 160 to perform the key operation. The key server 160 performs the key operation and transmits the key operation response 185 back to the certificate authority 115.

Figure 2:
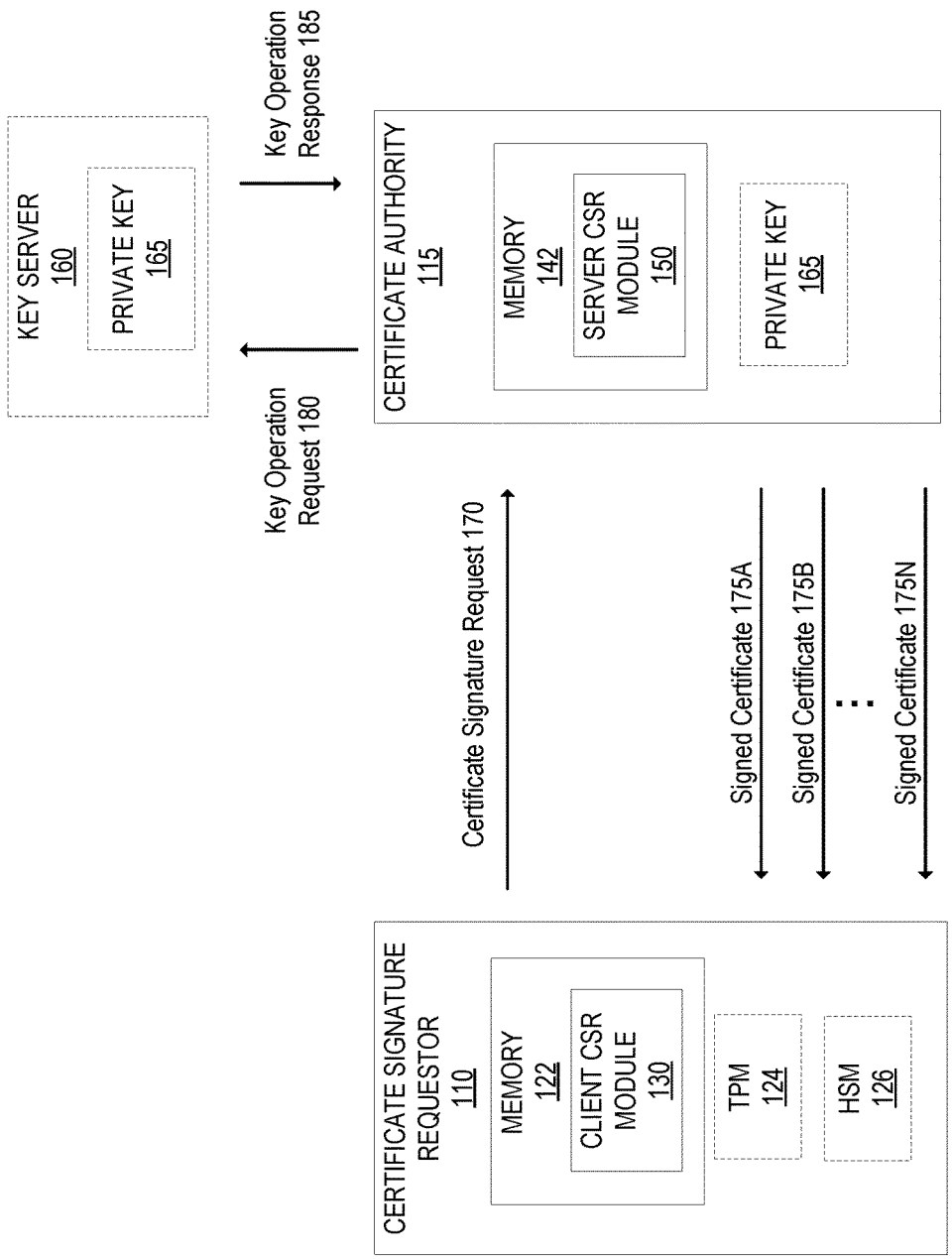
FIG. 2 illustrates an exemplary architecture of a certificate authority framework according to some embodiments where the CA periodically generates a short-expiry certificate based on a single CSR request.

In one embodiment, upon receipt of a CSR, the CA periodically produces short-expiry certificates that are created and scheduled based on at least frequency and expiry length. For example, upon receipt of a single CSR, the CA can generate and provide certificates once a week that each expire in 5 weeks. FIG. 2 illustrates an exemplary architecture of a certificate authority framework according to some embodiments where the CA 115 periodically generates a short-expiry certificate based on a single CSR request. For instance, the certificate authority 115 receives the CSR 170 and generates the certificates 175A-N in a periodic fashion. The certificates 175A-N have a short-expiry (less than a year and typically less than a week).

Figure 3:
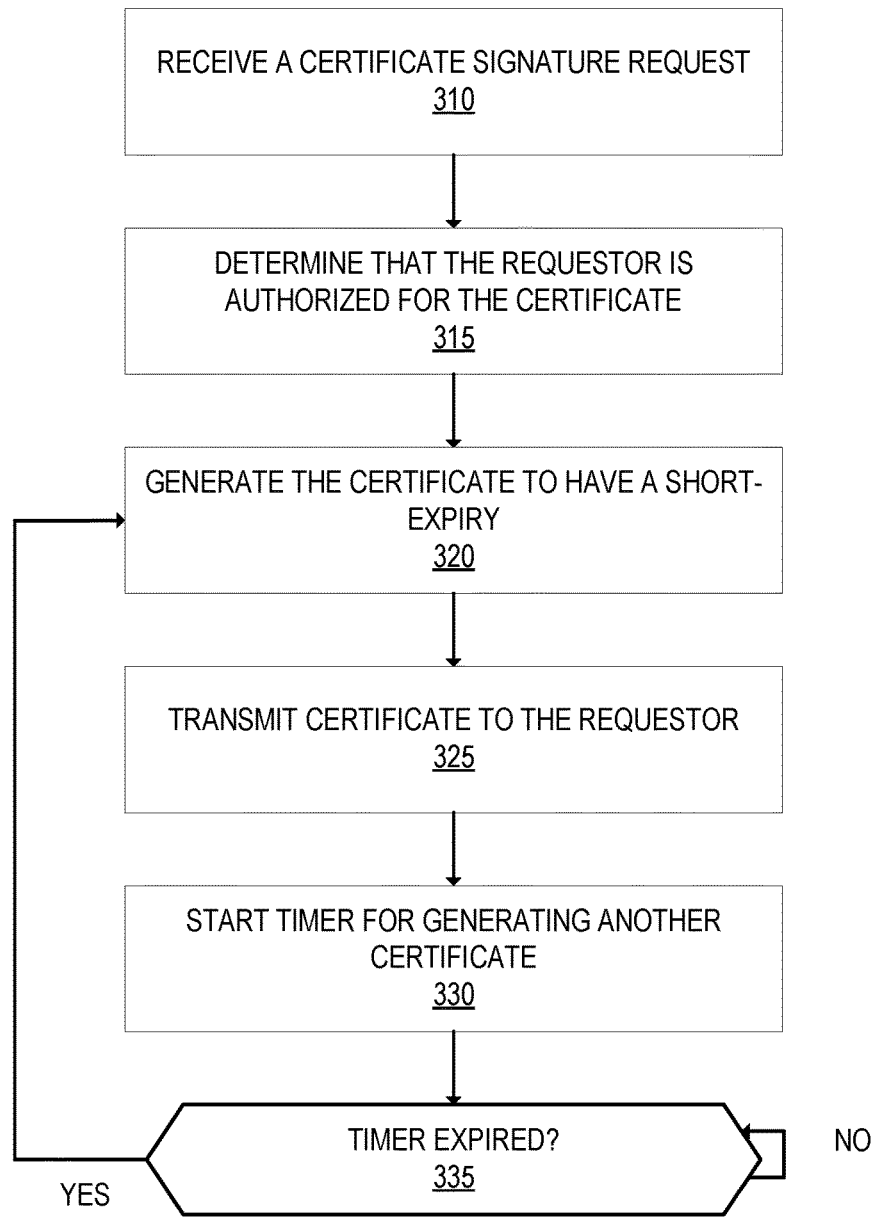
FIG. 3 is a flow diagram that illustrates exemplary operations for producing short-expiry certificates according to one embodiment.

FIG. 3 is a flow diagram that illustrates exemplary operations for producing short-expiry certificates according to one embodiment. The operations of FIG. 3 are performed by the server CSR module 150 in one embodiment. At operation 310, the server CSR module 150 receives a certificate signature request from a certificate signature requestor. The certificate signature request includes information that identifies the applicant, a public key, and is signed using a corresponding private key of the requestor.

Next, at operation 315, the server CSR module 150 determines that the requestor is authorized for the certificate. For instance, the server CSR module 150 checks the digital signature in the CSR and checks whether the requesting party should be given a certificate and which domains/IPs that certificate should be valid. There are different procedures for such validation and some of which may include interaction on behalf of the requester. For example, an email validation system may be used where an email is sent to one or more authorized addresses (e.g., an email listed in the WHOIS database for the domain, or other predefined email addresses (e.g., admin@example.com, administrator@example.com, hostmaster@example.com, postmaster@example.com, root@example.com, webmaster@example.com, and info@example.com)) that includes a link that when selected causes a token to be sent to the certificate authority or may be replied to in order to validate authenticity. As another example, a web page validation procedure may be used where the server CSR module 150 issues a unique code for the domain (or subdomain) and this code is then entered into a web page (either automatically by the server or by the customer) that is sent to the server CSR module for validating. The server CSR module 150 may also use other authentication techniques (e.g., placing a phone call, accessing public records databases, etc.). The server CSR module 150 may also cause the validation to be performed by other computing devices by transmitting a request to another computing device to validate the CSR and receive a response accordingly.

Assuming that the requestor is authorized for the requested certificate, flow then moves to operation 320. At operation 320, the server CSR module 150 generates the certificate to have a short-expiry (typically less than a year). In embodiments where the server CSR module 150 has access to the private key 165, the server CSR module 150 signs the certificate using that private key 165. In embodiments where the server CSR module 150 does not have access to the private key 165 (e.g., the private key 165 is remotely stored on the key server 160), the server CSR module 150 generates a key operation request to the key server 160 to perform the key operation (e.g., to sign the certificate). The key operation request includes information necessary for the key server 160 to perform the key operation. The key server 160 performs the key operation and transmits the key operation response back to the certificate authority 115, which in this case is a signature for the digital certificate.

Next, at operation 325, the server CSR module 150 transmits the signed certificate to the requestor. As will be described in greater detail later herein, the signed certificate may be transmitted to the requestor and transmitted to a number of other certificate signature requestors. For example, in embodiments where the requestor is one requestor of a group of requestors that are geographically located and are anycasted to the same IP address, the server CSR module 150 may transmit the signed certificate to each of the group of requestors. The requestors that receive the signed certificates install the certificates.

At operation 330, the server CSR module 150 starts a timer for generating another signed certificate. The length of the timer is less than the certificate expiry. For instance, if the certificate expires after one week, the timer will be set sometime before one week. At operation 335, a determination is made whether the timer has expired. When it expired, flow moves back to operation 320 where the certificate is generated to have a short-expiry. The server CSR module 150 may store information of the certificate signature request (e.g., the organization name, public key, etc.) such that the short-expiry certificates can be generated without having the requestor resubmit the CSR.

In another embodiment, the server CSR module 150 periodically generates the certificates after receiving a CSR, but does not transmit them to a certificate signature requestor until that requestor transmits a request for a new certificate. This request may include less information than a typical CSR request since it is effectively requesting a refreshed certificate. In such an embodiment, the client CSR module of a certificate signature requestor periodically fetches, from the certificate authority, a refreshed certificate.

In some embodiments, the certificate signature requestor 110 and/or the certificate authority 115 are part of a point-of-presence (POP) where there may be multiple POPs geographically distributed. A POP is a collection of networking equipment that is geographically distributed thereby decreasing the distance between requesting client devise and content. Multiple certificate signature requestor 110 may have the same anycast IP address. The network topology determines the best route to find the nearest certificate signature requestor. For instance, in the case where the certificate signature requester 110 implements a web server, when a DNS request is made for a domain that corresponds to the web server, the network transmits the DNS request to the closest authoritative name server which then responds with the certificate signature requestor 110 that is closest to the requesting client device. Thus, an anycast IP address allows a domain to resolve to a physically different certificate signature requestor 110 even though multiple physical devices may share that same IP address. Anycast is also useful as a reliability mechanism as it can provide automatic failover. For example, if one of the certificate signature requestors fail, the request will be automatically routed to another certificate signature requestor that shares the same anycast IP address. In embodiments where there are multiple certificate signature requestors 110 that share the same IP address, a certificate may be installed in multiple certificate signature requestors 110. In addition, in embodiments where there are multiple CAs in POPs, each CA may store the private key.

Figure 4:
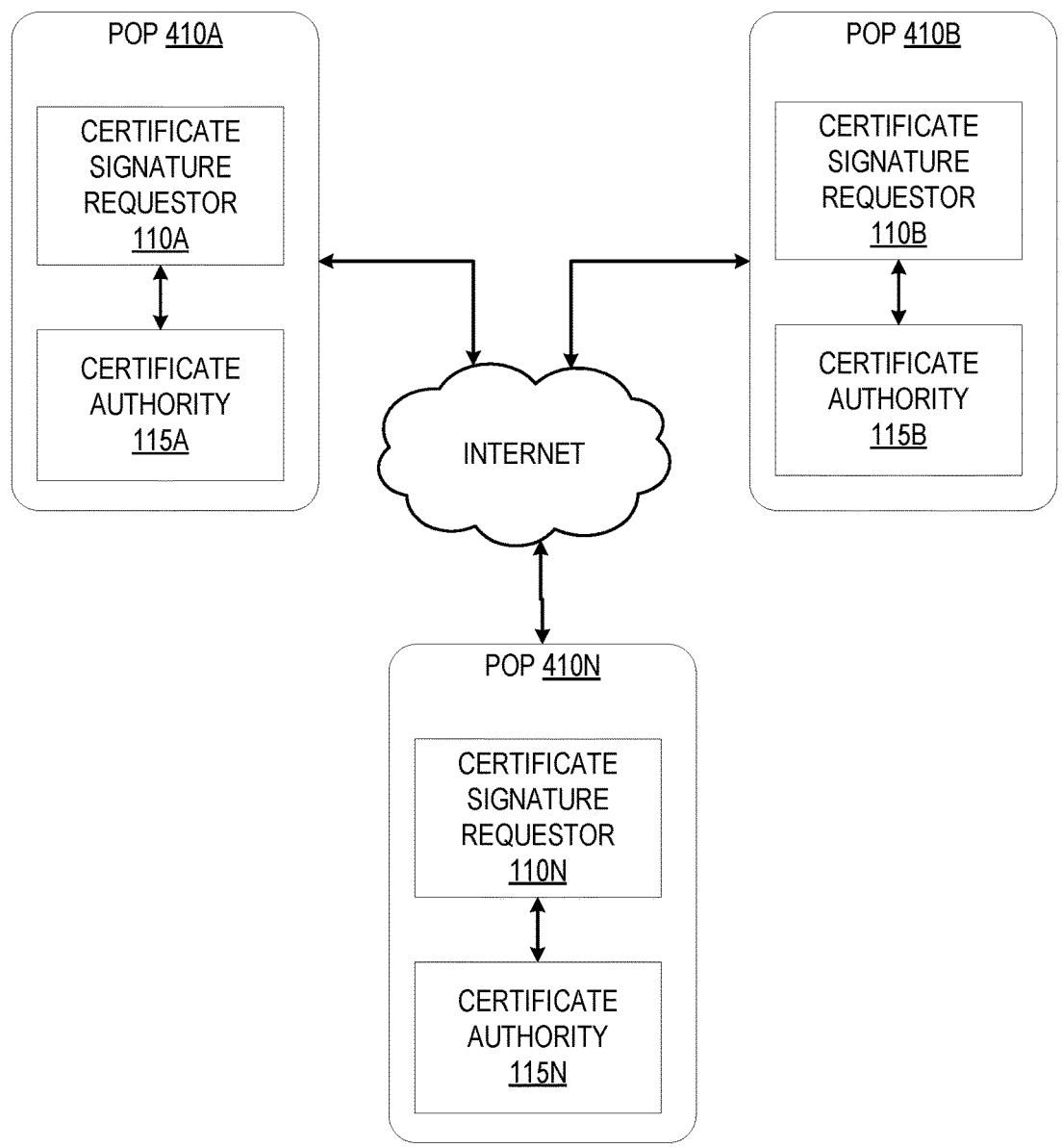
FIG. 4 illustrates an exemplary architecture of a certificate authority framework according to some embodiments.

FIG. 4 illustrates an exemplary architecture of a certificate authority framework according to some embodiments. In the example illustrated in FIG. 4, there are multiple POPs 410A-N that are geographically distributed that include the certificate signature requestors 110A-N and certificate authorities 115A-N respectively. When requesting a certificate, the certificate signature requestor 110 transmits the request to the certificate authority 115 that is part of the same POP. In some embodiments, the same CA-signing private key is stored on each of the certificate authorities 115A-N (bound to hardware using a TPM or HSM). In other embodiments, at least some of the certificate authorities 115A-N do not have access to the CA-signing private key (e.g., the private key is stored on a remote key server) and when a key operation is needed (e.g., when the certificate needs to be signed), the certificate authority transmits a key operation request to the key server to perform the key operation, as described herein. The certificates may be generated in accordance with the embodiment described in FIG. 3 in some embodiments.

Figure 5:
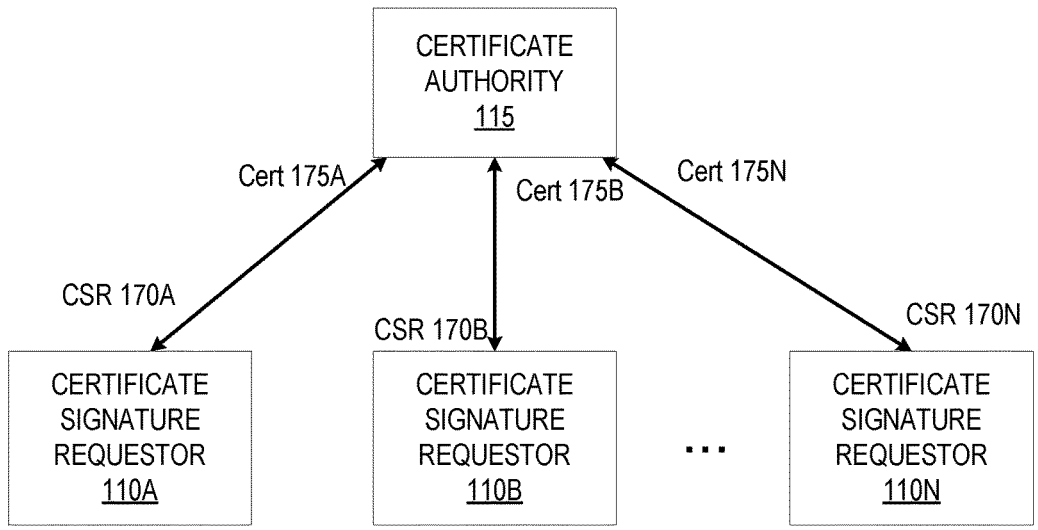
FIG. 5 illustrates one exemplary architecture of a certificate authority framework according to some embodiments.

FIG. 5 illustrates one exemplary architecture of a certificate authority framework according to some embodiments. As illustrated in FIG. 5, the certificate authority 115 is centralized and is coupled with a number of certificate signature requestors 110A-N, where N is greater than one. In the architecture of FIG. 5, the certificate authority 115 creates the certificates 175A-N in response to receiving CSRs 170A-N respectively and distributes the generated certificates to the certificate signature requestors 110A-N respectively. Although not illustrated in FIG. 5, it should be understood that the certificate authority 115 may not have access to the CA-signing private key and instead may transmit a key operation request to a remote key server to perform the key operation as described herein. The certificates may be generated in accordance with the embodiment described in FIG. 3 in some embodiments.

Figure 6:
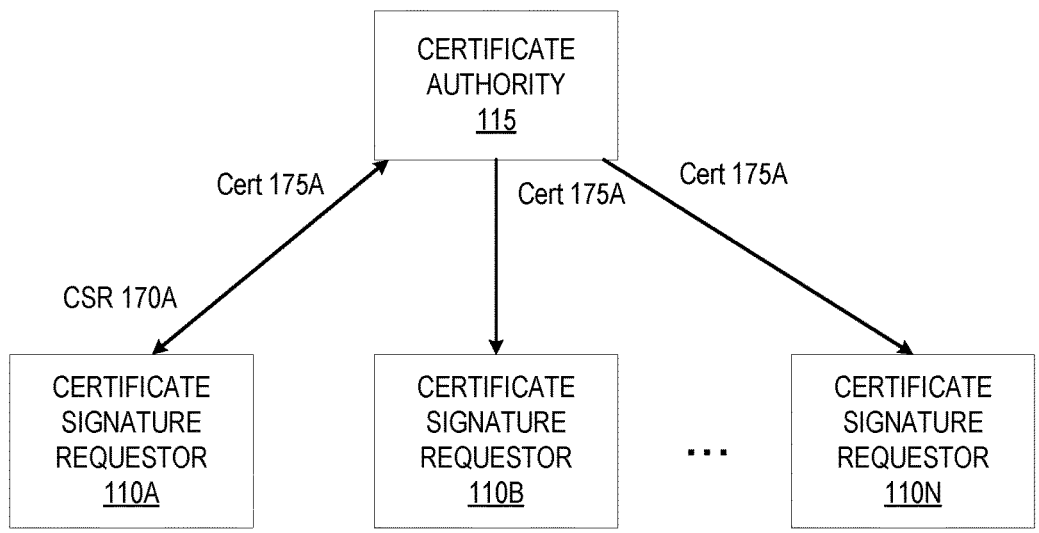
FIG. 6 illustrates an exemplary architecture of a certificate authority framework according to some embodiments.

FIG. 6 illustrates an exemplary architecture of a certificate authority framework according to some embodiments. Similar to FIG. 5, the certificate authority 115 is centralized. However, unlike FIG. 5, the certificate authority 115 may receive a CSR 170A from a first certificate signature requestor 110A, generate the certificate 175A in response to that CSR 170A, and distribute the same certificate 175A to the certificate signature requestors 110A-N. Although not illustrated in FIG. 6, it should be understood that the certificate authority 115 may not have access to the CA-signing private key and instead may transmit a key operation request to a remote key server to perform the key operation as described herein. The certificates may be generated in accordance with the embodiment described in FIG. 3 in some embodiments.

Certificate Chain Bundling

Different browsers have different capabilities and configurations. As a result, a certificate bundle that is trusted in one browser might not be trusted in another browser. For example, some browsers trust different root certificates including trusting more root certificates than others. As another example, older systems may have old root stores that are not supported by more recently-created certificate authorities. As another example, older systems may not support modern cryptography techniques and thus cannot validate certificates that use those unsupported cryptography techniques. One way of dealing with these problems is to pick a different certificate chain than the one originally provided by the CA. This alternate chain may contain a different set of intermediate certificates that are signed by a different root certificate. Alternate chains can be troublesome as they tend to include a longer list of certificates than the default chain from the CA, and longer chains may cause slower site connections (the web server needs to send more certificates (i.e. more data) to the browser, and the browser has to spend time verifying more certificates on its end). Thus selecting the right chain can be difficult.

In an embodiment, a certificate chain is automatically selected and created that is designed to be accepted by a majority of operating systems and browsers with optimal performance After a certificate for a website or other service is generated (whether created offline or through ways described herein), a certificate bundle is generated.

Figure 7:
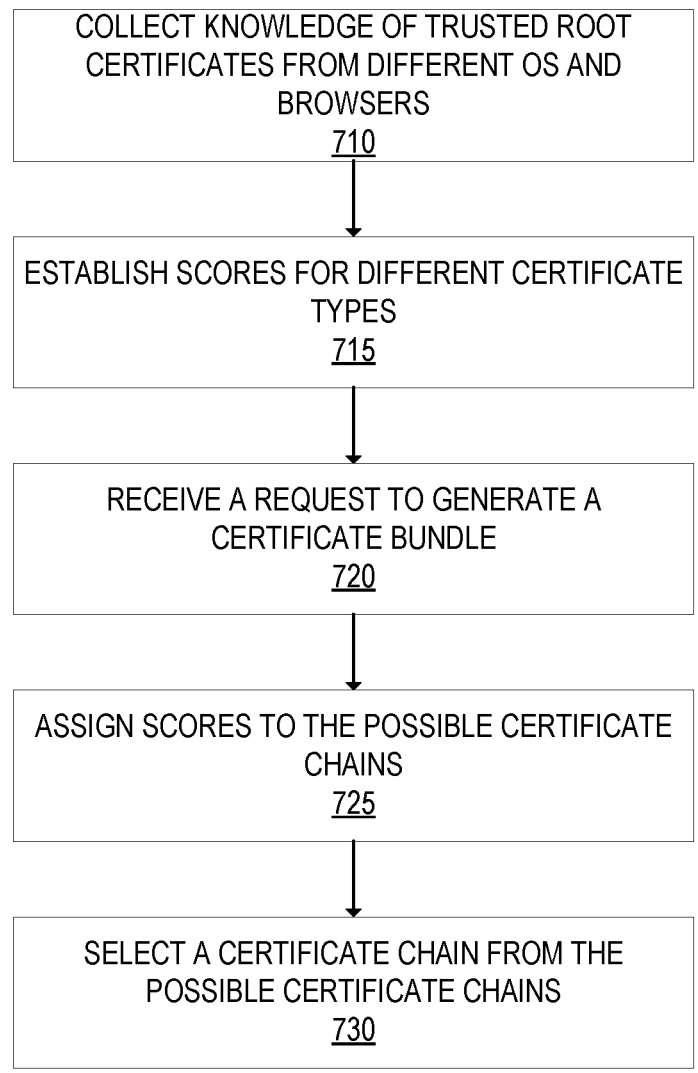
FIG. 7 is a flow diagram that illustrates exemplary operations for generating a certificate bundle according to one embodiment.

FIG. 7 is a flow diagram that illustrates exemplary operations for generating a certificate bundle according to one embodiment. The operations of FIG. 7 can be performed by either the client CSR module 130 or the server CSR module 150, or other computing device.

At operation 710, knowledge of trusted root certificates from different operating systems and browsers is collected. These operating systems and browsers may be the most common operating systems and browsers that are currently being used.

Next, at operation 715, scores for different certificate types and properties is established. These scores may be used as values to rank and sort the certificate chains. The scores may be assigned based on heuristic analysis and may change over time. These scores may be stored on the certificate authority. By way of example, a ranking score may be assigned for the hash used and may be based on ubiquity (how commonly supported that particular hash algorithm is) and/or security (how secure that particular hash algorithm is). For instance, the SHA1 hash algorithm may receive a higher ranking score than the SHA2 hash algorithm because SHA2 is currently not supported on some legacy systems. Other hash algorithms such as MD2/MD5 may receive a lower ranking score because they are not as secure as SHA1 and SHA2 hash algorithms As another example, a ranking score may be assigned for the cryptographic algorithm used for the certificate and may be based on ubiquity (how commonly supported that particular cryptographic algorithm is) and/or security (how secure that particular cryptographic algorithm is). For instance, the RSA and DSA cryptographic algorithms are commonly supported across many different platforms so they may receive a relatively high ranking score. Elliptic Curve algorithms such as ECDSA256, ECDSA384, and ECDSA521 are currently less supported than RSA and DSA so they may receive a lower ranking score than RSA and DSA. As another example, a ranking score may be assigned based on the expiry dates, where certificates that expire later are ranked higher than ones that expire earlier. Flow then moves to operation 720.

Next, at operation 720, the certificate authority receives a request to generate a certificate bundle for a certificate of a service or website. The request may include parameters for the certificate bundle generation such as preferences for selecting the certificate bundle such as requested algorithm types, requested chain length, etc. Flow then moves to operation 725.

At operation 725, the certificate authority assigns score rankings to the possible certificate chains for this certificate bundle based on the stored scores. For instance, the certificate authority may sum the scores of the hash algorithm(s) used in the certificates in the certificate chain to generate a hash score for each possible certificate chain. As another example, the certificate authority may sum the scores of the cryptographic algorithm(s) used in the certificates in each certificate chain to generate a cryptographic algorithm score for the certificate chain.

Next, at operation 730, the certificate authority selects a certificate chain from the possible certificate chain. For example, the certificate authority selects the certificate chain that has the highest score. The selection of the certificate chain may be using a series of filtering criteria with tie-breakers.

One example criteria that may be used is highest cross platform ubiquity (how commonly supported that certificate chain is across different operating systems and browsers). This criteria takes as input the ranking score for the hash algorithm(s) used in the certificate chain and/or the ranking score for the cryptographic algorithm(s) used in the certificate chain.

Another example criteria that may be used is the homogeneity of a certain hashing algorithm across the certificates in the certificate chain. For instance, a certificate chain whose certificates (excluding the root) each use the SHA2 hashing algorithm may be rated higher than a certificate chain that a chain that does not have such homogeneity.

Another example criteria that may be used is the length of the certificate chains. Typically a smaller length certificate chain is preferred over a longer length certificate chain if everything else is equal.

Another example criteria that may be used is the hash algorithm ubiquity of the certificates in the certificate chain. This criteria takes as input the ranking score for the hash algorithm(s) used by the certificates in the certificate chain.

Another example criteria that may be used is the cryptographic algorithm ubiquity of the certificates in the certificate chain. This criteria takes as input the ranking score for the cryptographic algorithm(s) used by the certificates in the certificate chain.

Another example criteria that may be used is the expiry of the certificates in the certificate chain. Generally, certificates that expire later are ranked higher than ones that expire earlier.

Another example criteria that may be used is the strength of the cryptographic algorithm of the certificates in the certificate chain.

Any one or more of these example criteria may be used, and in any order, when selecting a certificate chain. In an embodiment, a system operator or user may selectively apply the criteria and/or the order in which the criteria is applied. As a specific example, the order in which the criteria is applied is as follows. First the highest cross platform ubiquity criteria is used to determine which chain(s) have the highest cross platform ubiquity. If there are more than two candidate chains remaining after applying this criteria, then the next criteria that is applied is the homogeneity of a specified hashing algorithm across the certificates in the certificate chain. If there are more than two candidate chains remaining after applying this criteria, then the next criteria that is applied is the certificate chain length criteria. If there are more than two candidate chains remaining after applying this criteria, then the next criteria that is applied is the hash algorithm ubiquity criteria. If there are more than two candidate chains remaining after applying this criteria, then the next criteria that is applied is the cryptographic algorithm ubiquity. If there are more than two candidate chains remaining after applying this criteria, then the next criteria that is applied is the expiry of the certificates criteria. If there are more than two candidate chains remaining after applying this criteria, then the next criteria that is applied is the strength of the cryptographic algorithm.

The techniques shown in the figures can be implemented using code and data stored and executed on one or more electronic devices (e.g., a client device, a proxy server, a key server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
   receiving, at a certificate authority device from a certificate signature requestor, a single certificate signature request from a requestor;
   determining that the requestor is authorized for a digital certificate corresponding to the single certificate signature request;
   generating a first digital certificate corresponding to the single certificate signature request, wherein the first digital certificate has a first expiry value;
   transmitting the generated first digital certificate to the requestor;
   initiating, by the certificate authority device, a timer with an amount of time less than the first expiry value, wherein a subsequent digital certificate corresponding to the single certificate signature request is generated in response to expiration of the timer;
   responsive to the expiration of the timer, automatically generating, by the certificate authority device, a second digital certificate corresponding to the single certificate signature request without receiving a second certificate signature request from the requestor that corresponds with the single certificate signature request; and
   transmitting, by the certificate authority device to the certificate signature requestor, the generated second digital certificate to the requestor.

2. The method of claim 1, wherein determining that the requestor is authorized for the digital certificate corresponding to the single certificate signature request includes checking a digital signature in the single certificate signature request.

3. The method of claim 2, wherein determining that the requestor is authorized for the digital certificate corresponding to the single certificate signature request further includes causing an email to be sent to an authorized email address that includes a link that when selected causes a token to be sent to validate authenticity.

4. The method of claim 2, wherein determining that the requestor is authorized for the digital certificate corresponding to the single certificate signature request further includes issuing a unique code for a domain for the single certificate signature request that is to be input into a web page to be received for validating.

5. The method of claim 1, wherein generating the first digital certificate corresponding to the single certificate signature request includes signing the first digital certificate using a locally accessible private key.

6. The method of claim 1, wherein generating the first digital certificate corresponding to the single certificate signature request includes:
   sending, to a key server that has access to a private key for signing the first digital certificate, a key operation request to sign the first digital certificate, and receiving, from the key server, a key operation response that includes a signature for the first digital certificate.

7. The method of claim 1, further comprising:
wherein the requestor is one of a plurality of requestors that are anycasted to a same IP address; and
transmitting the generated first digital certificate to each of the other plurality of requestors in addition to the requestor.

8. The method of claim 1, further comprising:
storing information of the single certificate signature request.

9. The method of claim 8, wherein transmitting the generated second digital certificate to the requestor is performed responsive to receiving the second certificate signature request from the requestor that corresponds with the single certificate signature request.

10. A non-transitory machine-readable storage medium that stores instructions that, when executed by a processor, cause the processor to perform operations comprising:
receiving, at a certificate authority device from a certificate signature requestor, a single certificate signature request from a requestor;
determining that the requestor is authorized for a digital certificate corresponding to the single certificate signature request;
generating a first digital certificate corresponding to the single certificate signature request, wherein the first digital certificate has a first expiry value;
transmitting the generated first digital certificate to the requestor;
initiating, by the certificate authority device, a timer with an amount of time less than the first expiry value, wherein a subsequent digital certificate corresponding to the single certificate signature request is generated in response to expiration of the timer;
responsive to the expiration of the timer, automatically generating, by the certificate authority device, a second digital certificate corresponding to the single certificate signature request without receiving a second certificate signature request from the requestor that corresponds with the single certificate signature request; and
transmitting, by the certificate authority device to the certificate signature requestor, the generated second digital certificate to the requestor.

11. The non-transitory machine-readable storage medium of claim 10, wherein determining that the requestor is authorized for the digital certificate corresponding to the single certificate signature request includes checking a digital signature in the single certificate signature request.

12. The non-transitory machine-readable storage medium of claim 11, wherein determining that the requestor is authorized for the digital certificate corresponding to the single certificate signature request further includes causing an email to be sent to an authorized email address that includes a link that when selected causes a token to be sent to validate authenticity.

13. The non-transitory machine-readable storage medium of claim 11, wherein determining that the requestor is authorized for the digital certificate corresponding to the single certificate signature request further includes issuing a unique code for a domain for the single certificate signature request that is to be input into a web page to be received for validating.

14. The non-transitory machine-readable storage medium of claim 10, wherein generating the first digital certificate corresponding to the single certificate signature request includes signing the first digital certificate using a locally accessible private key.

15. The non-transitory machine-readable storage medium of claim 10, wherein generating the first digital certificate corresponding to the single certificate signature request includes:
sending, to a key server that has access to a private key for signing the first digital certificate, a key operation request to sign the first digital certificate, and
receiving, from the key server, a key operation response that includes a signature for the first digital certificate.

16. The non-transitory machine-readable storage medium of claim 10, wherein the requestor is one of a plurality of requestors that are anycasted to a same IP address, and wherein the non-transitory machine-readable storage medium further stores instructions that, when executed by the processor, cause the processor to further perform operations including transmitting the generated first digital certificate to each of the other plurality of requestors in addition to the requestor.

17. The non-transitory machine-readable storage medium of claim 10, wherein the non-transitory machine-readable storage medium further stores instructions that, when executed by the processor, cause the processor to further perform operations including:
storing information of the single certificate signature request.

18. The non-transitory machine-readable storage medium of claim 17, wherein transmitting the generated second digital certificate to the requestor is performed responsive to receiving the second certificate signature request from the requestor that corresponds with the single certificate signature request.

19. An apparatus, comprising:
a processor;
a non-transitory machine-readable storage medium that stores instructions that, when executed by the processor, cause the processor to perform the following:
receive, at a certificate authority device from a certificate signature requestor, a single certificate signature request from a requestor;
determine that the requestor is authorized for a digital certificate corresponding to the single certificate signature request;
generate a first digital certificate corresponding to the single certificate signature request, wherein the first digital certificate has a first expiry value;
transmit the generated first digital certificate to the requestor;
initiating, by the certificate authority device, a timer with an amount of time less than the first expiry value, wherein a subsequent digital certificate corresponding to the single certificate signature request is generated in response to expiration of the timer;
responsive to the expiration of the timer, automatically generate, by the certificate authority device, a second digital certificate corresponding to the single certificate signature request without receiving a second certificate signature request from the requestor that corresponds with the single certificate signature request; and
transmit, by the certificate authority device to the certificate signature requestor, the generated second digital certificate to the requestor.

20. The apparatus of claim 19, wherein the determination that the requestor is authorized for the digital certificate corresponding to the single certificate signature request includes a check of a digital signature in the single certificate signature request.

21. The apparatus of claim 20, wherein the determination that the requestor is authorized for the digital certificate corresponding to the single certificate signature request further includes causing an email to be sent to an authorized email address that includes a link that when selected causes a token to be sent to validate authenticity.

22. The apparatus of claim 20, wherein the determination that the requestor is authorized for the digital certificate corresponding to the single certificate signature request further includes issuing a unique code for a domain for the single certificate signature request that is to be input into a web page to be received for validating.

23. The apparatus of claim 19, wherein the generation of the first digital certificate corresponding to the single certificate signature request includes signing the first digital certificate using a locally accessible private key.

24. The apparatus of claim 19, wherein the generation of the first digital certificate corresponding to the single certificate signature request includes:
  sending, to a key server that has access to a private key for signing the first digital certificate, a key operation request to sign the first digital certificate, and
  receiving, from the key server, a key operation response that includes a signature for the first digital certificate.

25. The apparatus of claim 19, wherein the requestor is one of a plurality of requestors that are anycasted to a same IP address, and wherein the non-transitory machine-readable storage medium further stores instructions that, when executed by the processor, cause the processor to further perform the following:
  transmit the generated first digital certificate to each of the other plurality of requestors in addition to the requestor.

26. The apparatus of claim 19, wherein the non-transitory machine-readable storage medium further stores instructions that, when executed by the processor, cause the processor to further perform the following:
  store information of the single certificate signature request.

27. The apparatus of claim 26, wherein the transmission of the generated second digital certificate to the requestor is to be performed responsive to receiving the second certificate signature request from the requestor that corresponds with the single certificate signature request.

* * * * *